July 18, 1939.   F. BREYER   2,166,124
METHOD OF DETECTING HIGH-FREQUENCY OSCILLATIONS
Filed Nov. 3, 1937

INVENTOR.
FELIX BREYER
BY
ATTORNEY.

Patented July 18, 1939

2,166,124

UNITED STATES PATENT OFFICE 2,166,124

METHOD OF DETECTING HIGH-FREQUENCY OSCILLATIONS

Felix Breyer, Hanover, Germany, assignor to Telefunken Gesellschaft für Drahtlose Telegraphie m. b. H., Berlin, Germany, a corporation of Germany Application November 3, 1937, Serial No. 172,519½
In Germany November 3, 1936

2 Claims. (Cl. 250—25)

The present invention relates to a method of and, in particular, devices for detecting and receiving high-frequency and particularly very short waves.

For the quantitative detection of high-frequency currents a device has been tried in which a thin resistance wire was heated by the high-frequency energy and the resistance variation occurring thereby was measured. To be able to employ sensible testing methods one has taken the wire traversed by the high frequency (barretter wire) as an arm of a bridge arrangement. A device of this kind is illustrated in Fig. 1 of the accompanying drawing. B represents the barretter consisting of a thin wire enclosed in an evacuated vessel and supplied from the dipole wires D', D'' with the high-frequency energy to be detected. The baretter acts as one arm of the bridge arrangement W, the one diagonal of which is shunted by a constant potential supply, while the remaining corners of the bridge are connected to the cathode and grid respectively of an electron discharge tube. Such a device is relatively insensitive as the resistance variations are proportional only to the first power of the temperature variations. Besides, the high-frequency carrying parts of the device must be connected to the bridge arrangement and the latter, in turn, to the succeeding amplifier or receiving indicator. Because of such an arrangement there exists numerous possibilities of interferences.

It has also been proposed to increase the sensibility and simplify the device by making the wire (which is heated by the high frequency) electron emissive, and to couple an anode to it so as to form a diode.

In Fig. 2 a device of this last kind is illustrated. The baretter wire B is inserted between the ends of two dipole halves D' and D'' and represents the cathode of a diode, the anode of which is designated by A. As the emission current within the saturation range varies in dependence on the temperature of the filament with a higher power than the resistance of the wire, an increase in sensibility is obtainable with this device as compared to a device according to Fig. 1.

An object of the present invention is to provide a still more sensitive, quantitatively effective receiving device, in which galvanic couplings between the high-frequency carrying circuit and the amplifier or indicator circuit, respectively, are avoided. This advantage is achieved, according to the invention, by conveying the light emitted from the filament to a photo-sensitive cathode and by utilizing the current of this photo-electric cell as a measure of the modulation of the received wave. It is recommendable so to arrange the filament of the baretter or to supply with such optical auxiliary means that the greatest possible portion of its light radiation impinges upon the photo-electric cell. By suitably choosing the spectral sensitivity of the photosensitive layer a great steepness of the demodulation characteristic and, thereby, a great sensitivity of the total arrangement may be achieved, which may be still increased, too, by simple means by a succeeding amplification.

To obtain the most favourable temperature of the baretter wire, an initial direct current heating in any known manner may be employed. In accordance with the invention the energy of this initial heating can be automatically adjusted by the steady current of the photo-electric cell so that the maximum exploitation corresponding to the spectral sensitivity of the photo-electric cell is obtained.

A better understanding of the invention may be had by referring to the following description, which is accompanied by a drawing, wherein.

Into a gas-tight vessel V two dipole halves D' and D'' are sealed, between which (at the current loop) a relatively thin filament B is inserted. At a distance thereof, but within the same vessel there is a photo-electric cathode $K_{ph}$ which is excited by the heat radiation of the barretter wire B. To utilize the whole radiation of the filament, a suitably designed reflector R is provided at the side of the wire B which is opposite that of the photo-electric cathode. Between the barretter wire B and the photo-electric cathode $K_{ph}$ there is the photo-cell anode $A_{ph}$ which must be designed as open-worked electrode, e. g. as a grid, lest it is to an appreciable extent in the way of the radiation intended to arrive from the filament at the cathode.

Figure 1:
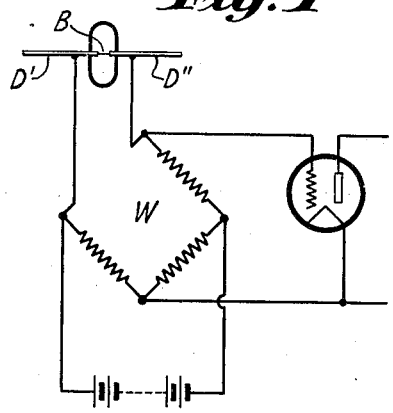
Fig. 1 represents one suggested type of high frequency detection system, described above.
Figure 2:
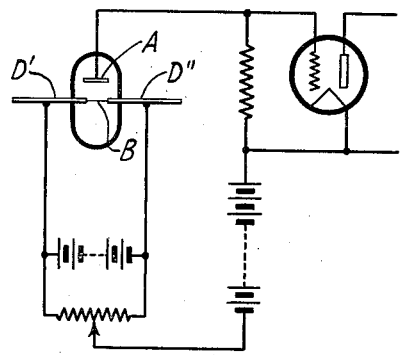
Fig. 2 represents another type of detection system which has been proposed.
Figure 3:
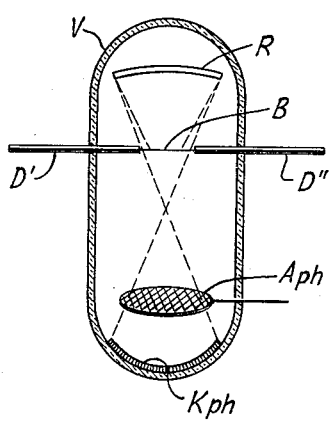
Fig. 3 illustrates schematically a high frequency receiving tube in accordance with the invention.
Figure 4:
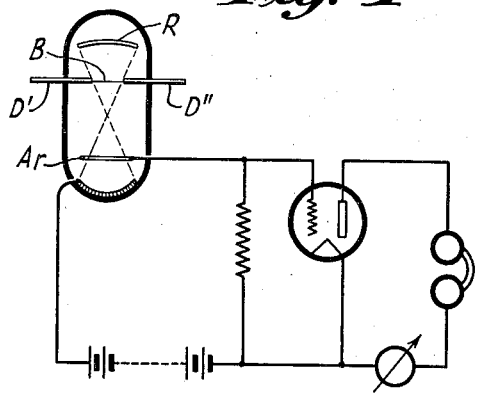
Fig. 4 shows schematically how the tube of the invention of Fig. 3 can be employed in connection with a complete circuit arrangement.

In Fig. 4 a receiving tube according to the invention is illustrated in connection with a succeeding amplifier stage. The receiving tube itself has been modified in some respects. The anode is designed as an annular electrode, lest the radiation is hindered in any way. The question of the initial heating may be, of course, solved in another way. A further possibility according to the invention, in which a galvanic connection to the barretter wire also is avoided, is offered by the radiation coupling or the capacity coupling. At the receiving station a separate high-frequency source is located, the frequency of which preferably is different from the receiving frequency. The high-frequency energy of this additional source may be transmitted to the barretter wire through radiation or capacity coupling and provides the initial heating.

With extraordinarily short waves it may happen that the greater part of the small dipole halves intended to receive the radiation lies within the vessel or in the walls of the tube. In such a case it is recommendable to make the length of the radiation receiver equal to an odd number of half wave lengths, e. g. to 3/2λ, and to make such an arrangement that at the center of the emissive portion of the filament and at the both seals one potential node each is existing, or one arranges the tuned, i. e. designed of a certain length, dipoles together with the emission source inside the vessel at all.

The idea of the present invention is not limited to the examples herein described and illustrated.

What is claimed is:

1. An electrical discharge device for receiving electrical oscillations comprising a thin filament wire, a photo-electric cathode located on one side of said filament wire and adapted to be heated by said filament, a reflector on the other side of said filament wire for concentrating the heat from said filament upon said photo-electric cathode, and an anode permeable to heat and light located between said filament wire and said cathode; said filament, photo-electric cathode, reflector and anode being located within a gas-tight envelope; and means connected to opposite ends of said filament wire for collecting high frequency energy.

2. An electrical discharge device for receiving electrical oscillations comprising a thin filament wire, a photo-electric cathode located on one side of said filament wire and adapted to be heated by said filament, a reflector on the other side of said filament wire for concentrating the heat from said filament upon said photo-electric cathode, and an anode permeable to heat and light located between said filament wire and said cathode; said filament, photo-electric cathode, reflector and anode being located within a gas-tight envelope; and a dipole antenna connected to said filament wire, said antenna having two arms connected to opposite ends of said filament.

FELIX BREYER.